D. C. PIERCE.
Thill-Coupling.

No. 211,305. Patented Jan. 14, 1879.

Witnesses.
Harry King
D. P. Cowl

Inventor.
Denison C. Pierce
By Stansbury & Munn
his Attys

UNITED STATES PATENT OFFICE.

DENISON C. PIERCE, OF CHICAGO, ILLINOIS, ASSIGNOR OF ONE-FOURTH HIS RIGHT TO FREDERICK W. MERRELL, OF MORRISTOWN, N. J.

IMPROVEMENT IN THILL-COUPLINGS.

Specification forming part of Letters Patent No. 211,305, dated January 14, 1879; application filed December 14, 1878.

*To all whom it may concern:*

Be it known that I, DENISON C. PIERCE, of Chicago, in the county of Cook and State of Illinois, have invented certain new and useful Improvements in Thill-Couplers; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
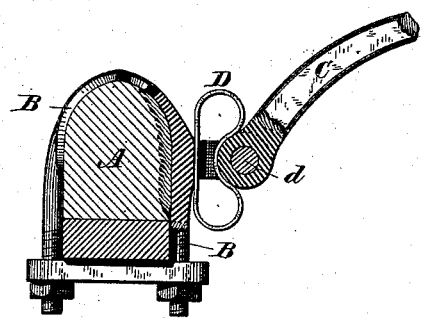
Figure 2:

Figure 1 is a transverse section of an axle, clip, and coupling with my device in its seat; and Fig. 2 is a view, in perspective, of my device detached.

The object of my invention is to produce a cheap, simple, and novel metallic spring-cushion anti-rattler for the thill-couplings of wagons and other vehicles.

It consists of a piece of ribbon spring-steel with its ends welded together and then formed into the shape hereinafter described, and inserted between the end of the thill-iron and clip.

In the drawings, A represents the axle of a wagon or other vehicle; B, the clip about the same; C, the thill-iron and end of shaft; and d, bolt connecting the thill to the clip, all made in the ordinary form.

As is well known, the parts forming the coupling proper wear away more or less, and then cause an unpleasant rattling noise. In order to prevent this noise, I take a piece of ribbon spring-steel of any desired length, and, after welding its ends together, bend it in such form that its rear side shall be straight, its front side concave, and its ends circular, as shown in Fig. 2. The device thus formed is then properly tempered and inserted between the clip and the end of the thill-iron, as shown in Fig. 1, when it will be seen its straight side bears evenly against the clip, while its concave side embraces the end of the thill-iron and its circular ends form springs, as well as prevent it from escaping or flying from its seat.

This metallic spring device, it will be seen, is formed of one piece, that it can be readily adjusted to or removed from its seat; that it requires no attachment; that it constantly, when in position, presses against the end of the thill-iron, and thus prevents rattling, while it, at the same time, forms a cushion to receive sudden jars.

Having thus described my invention, what I claim is—

In combination with a thill-coupling device for wagons and other vehicles, an anti-rattling device, consisting of the metallic spring, D, constructed with its rear side straight, front side concave, and ends circular, substantially as herein shown and described.

In testimony that I claim the foregoing as my own I affix my signature in presence of two witnesses.

DENISON C. PIERCE.

Witnesses:
GEO. F. GRAHAM,
H. B. MUNN.